(12) United States Patent
Xing et al.

(10) Patent No.: US 12,130,263 B2
(45) Date of Patent: Oct. 29, 2024

(54) FLEXIBLE SCREEN TENSILE TEST DEVICE AND FLEXIBLE SCREEN TEST METHOD

(71) Applicant: SUZHOU CHINA STAR OPTOELECTRONICS TECHNOLOGY CO., LTD., Jiangsu (CN)

(72) Inventors: Yuepeng Xing, Jiangsu (CN); Feng Gao, Jiangsu (CN); Wenbing Zhang, Jiangsu (CN)

(73) Assignee: SUZHOU CHINA STAR OPTOELECTRONICS TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/758,132

(22) PCT Filed: Jun. 10, 2022

(86) PCT No.: PCT/CN2022/098172
§ 371 (c)(1),
(2) Date: Jun. 29, 2022

(87) PCT Pub. No.: WO2023/221207
PCT Pub. Date: Nov. 23, 2023

(65) Prior Publication Data
US 2024/0192101 A1    Jun. 13, 2024

(30) Foreign Application Priority Data

May 17, 2022  (CN) .......................... 202210540099.9

(51) Int. Cl.
*G01N 3/08*    (2006.01)

(52) U.S. Cl.
CPC ...................................... *G01N 3/08* (2013.01)

(58) Field of Classification Search
CPC ........... G01N 3/08; G01N 3/26; G01N 3/165; G01N 2021/9513; G01N 2203/0017
See application file for complete search history.

(56) References Cited

U.S. PATENT DOCUMENTS

| | | | |
|---|---|---|---|
| 9,239,236 B2 * | 1/2016 | Griess ................... | G01M 5/005 |
| 10,054,527 B2 * | 8/2018 | Liu ....................... | G01M 99/007 |
| 10,197,482 B2 * | 2/2019 | Gao ....................... | H10K 71/70 |

FOREIGN PATENT DOCUMENTS

| | | |
|---|---|---|
| CN | 204679342 U | 9/2015 |
| CN | 111122131 A | 5/2020 |

(Continued)

OTHER PUBLICATIONS

International Search Report in International application No. PCT/CN2022/098172, mailed on Dec. 26, 2022.

(Continued)

*Primary Examiner* — Freddie Kirkland, III
(74) *Attorney, Agent, or Firm* — PV IP PC; Wei Te Chung

(57) ABSTRACT

A flexible screen tensile test device and a flexible screen test method are provided. The flexible screen tensile test device includes a tensile unit, which includes a rotating disk having at least two rotating disk guide grooves, at least two telescopic slide rods positioned above the rotating disk and corresponding to the rotating disk guide grooves in a one-to-one correspondence, and sliding blocks connected with the telescopic slide rods and positioned in the rotating disk guide grooves.

20 Claims, 7 Drawing Sheets

(56) References Cited

FOREIGN PATENT DOCUMENTS

| CN | 111276435 A | 6/2020 |
|---|---|---|
| CN | 112198064 A | 1/2021 |
| CN | 113295524 A | 8/2021 |
| JP | 2009156725 A | 7/2009 |

OTHER PUBLICATIONS

Written Opinion of the International Search Authority in International application No. PCT/CN2022/098172, mailed on Dec. 26, 2022.

\* cited by examiner

FLEXIBLE SCREEN TENSILE TEST DEVICE AND FLEXIBLE SCREEN TEST METHOD

FIELD OF INVENTION

The present application relates to a field of flexible screen testing, particularly relates to a flexible screen tensile test device and a flexible screen test method.

BACKGROUND OF INVENTION

Flexible screens have become a most forward-looking research projects in a field of display technology due to their excellent elastic stretch properties and high pixel density.

Improving the performance of a flexible screen under tensile condition is one of the most critical technical projects for its development. A traditional test method uses a test device to perform tensile testing of a product, as shown in FIG. 1. In this method, two clips are used to clamp both ends of the product to be tested, a clip 101 at one end is fixed, and a clip 102 at another end moves to stretch the product to be tested, and then tensile properties of the product to be tested are obtained. However, the traditional tensile test method for testing flexible screens has following problems:

On the one hand, the clamping of the clips at both ends may damage the flexible screen, and on the other hand, the tensile force inside the flexible screen will be unevenly distributed during a tensile process.

Technical Problem

The present application provides a flexible screen tensile test device and a flexible screen test method to realize a tensile performance test of the flexible screen.

SUMMARY OF INVENTION

The present application provides a flexible screen tensile test device for testing a flexible screen, the test device includes a tensile unit, and the tensile unit includes: a rotating disk including at least two rotating disk guide grooves; at least two telescopic slide rods positioned above the rotating disk and corresponding to the rotating disk guide grooves in a one-to-one correspondence, wherein the telescopic slide rods are annularly arranged to a form a hollow ring column, a generatrix of the hollow ring column is perpendicular to the rotating disk, and an outer side wall of the hollow ring column is configured to support a flexible screen; and sliding blocks connected with the telescopic slide rods and positioned in the rotating disk guide grooves; wherein the rotating disk is rotatable within a predetermined angle to drive the telescopic slide rods to slide in a direction away from or close to a central axis of the hollow ring column and to cause a diameter of the hollow ring column changed from a first diameter to a second diameter, wherein the first diameter and the second diameter are different in size.

Optionally, in some embodiments of the present application, the rotating disk guide grooves are uniformly arranged on the rotating disk along a circumference of the rotating disk.

Optionally, in some embodiments of the present application, the rotating disk is annular, and an included angle between one of the rotating disk guide grooves and the circumference of the rotating disk is an acute angle.

Optionally, in some embodiments of the present application, each telescopic slide rod includes a tensile rod and a sliding rod, wherein one end of the tensile rod is vertically connected with the sliding rod, and another end of the tensile rod is connected with a respective one of the sliding blocks, the sliding rod is parallel to the rotating disk, the tensile rod is perpendicular to the rotating disk, and the tensile rods of the telescopic slide rods are annularly arranged to form the hollow ring column.

Optionally, in some embodiments of the present application, the tensile rod and the sliding rod are integrated, or the tensile rod and the sliding rod are fixedly connected.

Optionally, in some embodiments of the present application, each sliding block is connected to a respective one of the telescopic slide rods through a connecting piece, and the sliding block is rotatable with the connecting piece as a rotation axis.

Optionally, in some embodiments of the present application, a shape of a part of an outer side surface of the hollow ring column formed by the telescopic slide rods is an arc surface.

Optionally, in some embodiments of the present application, the tensile unit further includes a base arranged on a side of the rotating disk away from the telescopic slide rods, wherein the base includes an accommodating slot, and the rotating disk is arranged in the accommodating slot.

Optionally, in some embodiments of the present application, the base further includes an opening positioned on an outer side wall of the accommodating slot; wherein the rotating disk includes a rotating body positioned in the accommodating slot and a rotating handle protrudes from the rotating body, the rotating disk guide groove is defined on the rotating body, and wherein the rotating handle protrudes from an outer side wall of the base through the opening.

Optionally, in some embodiments of the present application, a central angle corresponding to the opening of the base is greater than the predetermined angle.

Optionally, in some embodiments of the present application, the tensile unit further includes an upper cover positioned on a side of the telescopic slide rods away from the base, wherein the upper cover and the base are fixedly connected.

Optionally, in some embodiments of the present application, the upper cover includes a first limiting hole positioned on a diameter of the upper cover, wherein one of the telescopic slide rods passes through the first limiting hole and is slidable along a diameter direction of the upper cover in the first limiting hole.

Optionally, in some embodiments of the present application, the upper cover further includes a second limiting hole corresponding to the first limiting hole, the second limiting hole and the first limiting hole are positioned on a same diameter, and wherein each sliding block is connected to a respective one of the telescopic slide rods through a connecting piece, and the connecting piece penetrates the telescopic slide rod and is partially located in the second limiting hole.

Optionally, in some embodiments of the present application, the second limiting hole is positioned on a side of the first limiting hole away from a center of the upper cover, a shape of the upper cover is annular, and the first limiting hole penetrates an inner side wall of the upper cover; or the second limiting hole is positioned on a side of the first limiting hole close to a center of the upper cover, and the first limiting hole penetrates an outer side wall of the upper cover.

Optionally, in some embodiments of the present application, the upper cover further includes an upper cover guide groove defined on a side of the upper cover facing the rotating disk; each telescopic slide rod includes a tensile rod and a sliding rod, the tensile rod and the sliding rod are vertically connected, and each tensile rod of the telescopic slide rods are annularly arranged to form the hollow ring column, and the sliding rod is positioned in the upper cover guide groove.

Optionally, in some embodiments of the present application, the upper cover guide groove penetrates through a side wall of the upper cover.

Optionally, in some embodiments of the present application, the test device further includes a drive unit and a controller connected to the drive unit, wherein the drive unit includes a driving handle and a force-displacement sensor, the driving handle is connected to the rotating disk, and the controller controls the driving handle to drive the rotating disk to rotate within the predetermined angle.

Correspondingly, the present application further provides a flexible screen test method, implemented by the flexible screen tensile test device according to any of the embodiments of the present application. The flexible screen test method includes: disposing and fixing the flexible screen on the outer side wall of the hollow ring column of the flexible screen tensile test device; and driving the telescopic slide rods of the flexible screen tensile test device to slide in a direction away from or close to the central axis of the hollow ring column through rotations of the rotating disk, to perform a tensile test or a contracting test on the flexible screen.

Correspondingly, the present application further provides a flexible screen test method, the step of driving the telescopic slide rods to slide in the direction away from or close to the central axis of the hollow ring column through rotations of the rotating disk to perform the tensile test or the contracting test on the flexible screen includes: controlling the drive unit of the flexible screen tensile test device through the controller to drive the rotating disk to rotate, drive the telescopic slide rods to slide in a direction away from or close to the central axis of the hollow ring column, and cause the flexible screen to stretch or contract; monitoring a force-displacement signal of the flexible screen in real-time through the force-displacement sensor of the flexible screen tensile test device; monitoring a current-voltage signal of the flexible screen in real-time through the test pattern signal generator of the flexible screen tensile test device; and analyzing the force-displacement signal and the current-voltage signal through the computer of the flexible screen tensile test device to obtain a test result of the flexible screen.

Advantages

The present application provides a flexible screen tensile test device and a flexible screen test method. The test device supports the flexible screen to be tested through a hollow ring column formed by telescopic slide rods that are annularly arranged. During the tensile test of the flexible screen, the telescopic slide rods are driven to slide in a direction away from or close to the central axis of the hollow ring column through controlling the rotations of the rotating disk within a predetermined angle, to realize the stretch and contraction of the flexible screen within a stretching range. In this way, the tensile stress in the flexible screen is uniformly distributed, which meets the testing requirements of the flexible screen.

DESCRIPTION OF DRAWINGS

The technical solutions and advantages of the present application will be clearly presented through the detailed description of the specific embodiments in the present application with reference to the accompanying drawings.

DETAILED DESCRIPTION OF PREFERRED EMBODIMENTS

In order to solve the problems existing in the traditional tensile test method, the present application provides a flexible screen tensile test device and a flexible screen test method.

Figure 1:
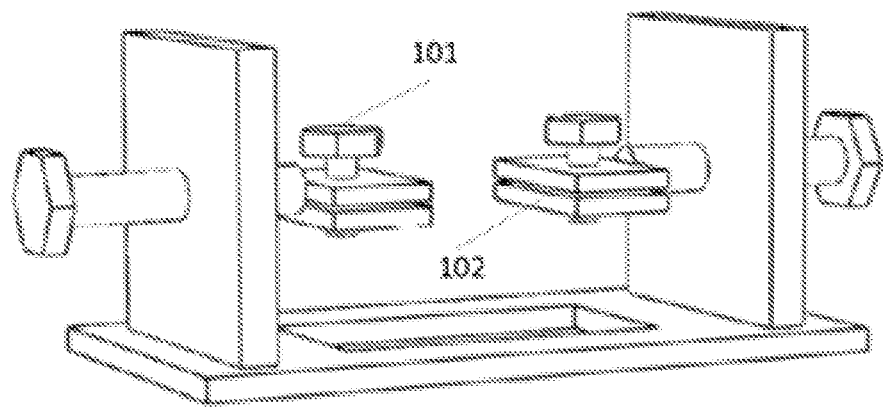
FIG. 1 is a schematic structural diagram of a traditional tensile test device.
Figure 2:
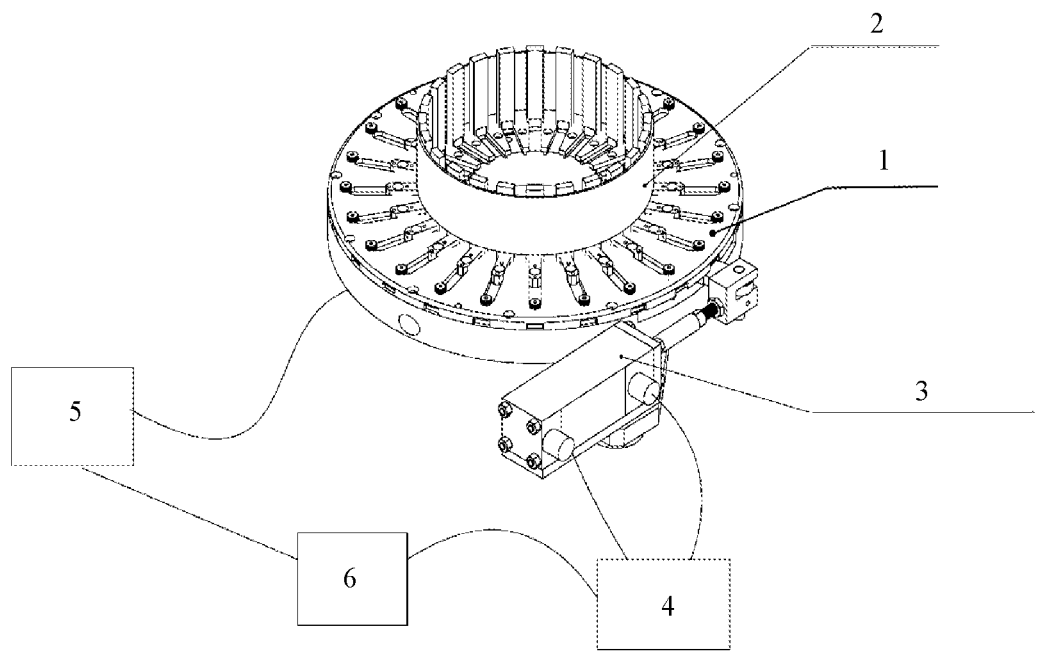
FIG. 2 is a schematic structural diagram of a flexible screen tensile test device provided by an embodiment of the present application.
Figure 3:
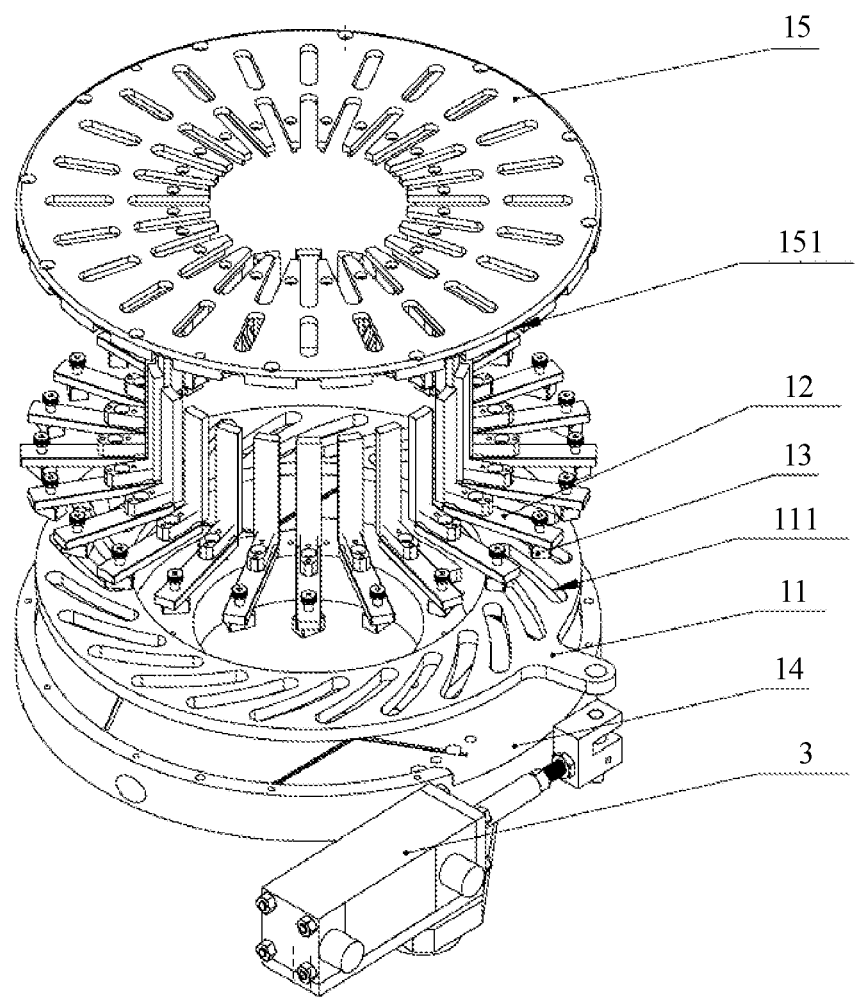
FIG. 3 is a schematic structural diagram of a tensile unit and a drive unit of a flexible screen tensile test device provided by the embodiment of the present application.

In one embodiment, please refer to FIG. 2 and FIG. 3. FIG. 2 is a schematic structural diagram of a flexible screen tensile test device provided by an embodiment of the application. FIG. 3 is a schematic structural diagram of a tensile unit and a drive unit of the flexible screen tensile test device provided by the embodiment of the application, and specifically includes an exploded diagram of a structure of the tensile unit. As shown in FIG. 2, the test device provided in the embodiment of the present application includes a tensile unit 1. As shown in FIG. 3, the tensile unit 1 includes: a rotating disk 11 including at least two rotating disk guide grooves 111; at least two telescopic slide rods 12 positioned above the rotating disk 11 and corresponding to the rotating disk guide grooves 111 in a one-to-one correspondence, wherein the telescopic slide rods 12 are annularly arranged to a form a hollow ring column, a generatrix of the hollow ring column is perpendicular to the rotating disk 11, and an outer side wall of the hollow ring column is configured to support a flexible screen 2; and sliding blocks 13 connected with the telescopic slide rods 12 and positioned in the rotating disk guide grooves 111; wherein the rotating disk 11 is rotatable within a predetermined angle to drive the telescopic slide rods 12 to slide in a direction away from or close to a central axis of the hollow ring column and to cause a diameter of the hollow ring column to change from a first diameter to a second diameter, wherein the first diameter and the second diameter are different in size.

In the embodiment of the present application, the telescopic slide rods 12 are annularly arranged to a form a hollow ring column to support a flexible screen 2 to be tested, and the telescopic slide rods 12 are driven to slide in a direction away from or close to a central axis of the hollow ring column through rotations of the rotating disk 11. This realizes the stretching and contraction of the flexible screen 2 within the stretching range. During the entire tensile process, the tensile force in the flexible screen 2 is evenly distributed, which meets the testing requirements of the flexible screen 2.

Figure 4:
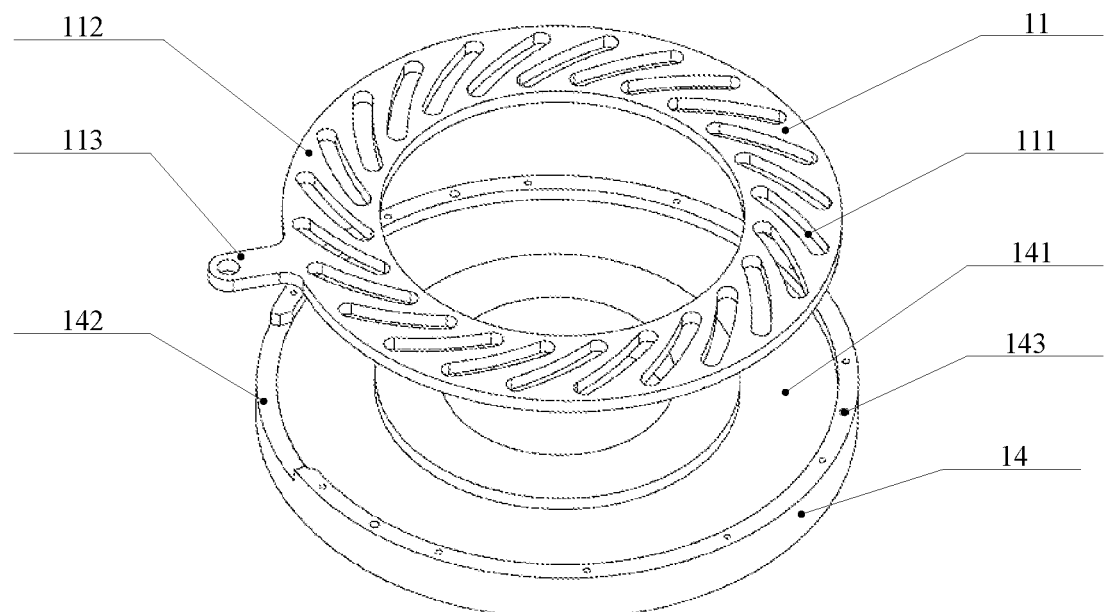
FIG. 4 is a schematic structural diagram of a base and a rotating disk of a tensile unit provided by an embodiment of the application.
Figure 5:
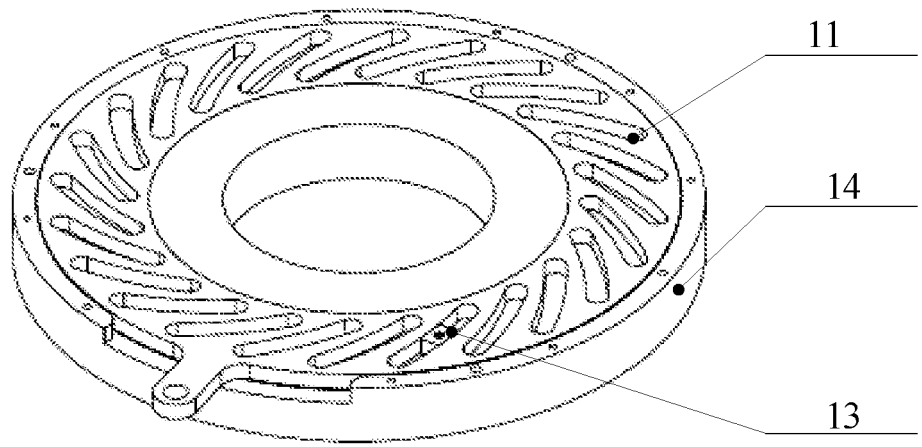
FIG. 5 is a schematic structural diagram of a base, a rotating disk, and sliding blocks of a tensile unit provided by an embodiment of the application.

In one embodiment, please refer to FIG. 4 and FIG. 5. FIG. 4 is a schematic structural diagram of a base and a rotating disk of a tensile unit provided by an embodiment of the application. FIG. 5 is a schematic structural diagram of a base, a rotating disk, and sliding blocks of a tensile unit provided by an embodiment of the application. The rotating disk 11 is a flat disk, the rotating disk guide grooves 111 are evenly defined on the rotating disk 11 along a circumferential direction, the rotating disk guide groove 111 forms an acute angle with the circumference of the disk, and the shape of the rotating disk guide groove 111 includes an arc. In one embodiment, the rotating disk 11 is a hollow annular disk. In other embodiments, the rotating disk 11 can also be a solid circular disk. The rotation of the rotary disk 11 can be driven manually or mechanically.

Figure 6:
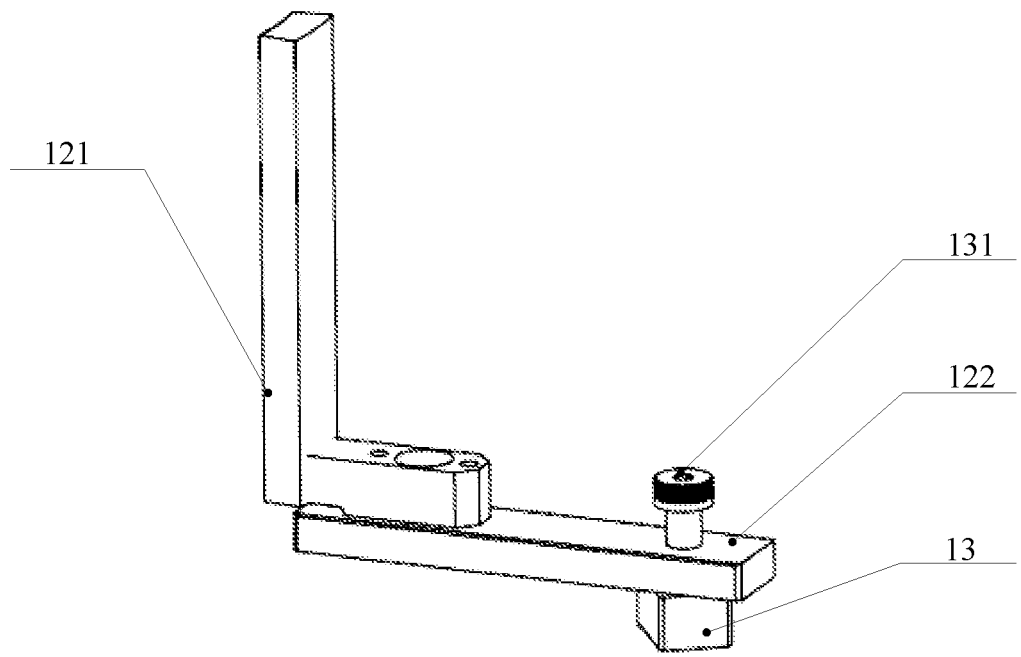
FIG. 6 is a schematic structural diagram of telescopic slide rods and sliding blocks of a tensile unit provided by an embodiment of the present application.

In one embodiment, please refer to FIG. 3 and FIG. 6. FIG. 6 is a schematic structural diagram of a telescopic slide rod and a sliding block of a tensile unit provided in one embodiment of the present application. The telescopic slide rod 12 includes a tensile rod 121 and a sliding rod 122. The tensile rod 121 is perpendicular to the sliding rod 122, the sliding rod 122 is parallel to the rotating disk 11, the tensile rod 121 is perpendicular to the rotating disk 11, and a plurality of the tensile rods 121 are annularly arranged to form a hollow ring column perpendicular to the rotating disk 11. One end of the sliding rod 122 is connected to the slider 13, and the other end of the sliding rod 122 is connected to the tensile rod 121. The sliding rod 122 and the tensile rod 121 may be integrally provided or may be fixedly connected through a connecting piece, and the connecting piece includes but is not limited to a screw 131. In one embodiment, as shown in FIG. 3, the sliding rod 122 is positioned on the side of the telescopic slide rod 12 close to the outer side wall of the hollow ring column. In another embodiment, the sliding rod 122 is positioned on the side of the telescopic slide rod 12 close to the inner side wall of the hollow ring column, which is exactly opposite to the structure shown in FIG. 3 and FIG. 6. Reference may be made to the reverse design of the structures shown in FIG. 3 and FIG. 6. The sliding block 13 and the sliding rod 122 are connected through a connecting piece, which is preferably a screw 131. Specifically, the screw 131 penetrates through the sliding hole of the sliding rod 122 and is fixedly connected with the sliding block 13, as shown in FIG. 6. Preferably, the screw 131 can rotate in the sliding hole, that is, the sliding block 13 is movably connected with the sliding rod 122, and the sliding block 13 can rotate around the screw 131 as a rotation axis. The sliding block 13 can rotate on its own with screw 131 as the rotation axis. In another embodiment, the telescopic slide rod 12 can be a vertical rod-shaped structure alone. The telescopic slide rod 12 is perpendicular to the rotating disk 11, and one end of the telescopic slide rod 12 close to the rotating disk 11 is movably connected to the sliding block 13, and the telescopic slide rods 12 are annularly arranged to form a hollow ring column perpendicular to the rotating disk 11. In other embodiments, the telescopic slide rod 12 may have other structural designs as long as the telescopic slide rods 12 are annularly arranged to form a hollow ring column and the end of the telescopic slide rod 12 close to the rotating disk 11 is connected to the sliding block 13, which fall into the technical content protected by the embodiments of the present application. In one embodiment, the number of the telescopic slide rods 12 is preferably an even number, for example, it can be 12, 24, or any other number. In this way, the telescopic slide rods 12 can be symmetrically arranged in the diameter direction of the hollow ring column, which further enhances the shape stability of the hollow ring column. In other embodiments, the number of the telescopic slide rods 12 may also be an odd number, which is not particularly limited herein. The shape of the part of the outer side surface of the hollow ring column formed by the annularly arranged telescopic slide rods 12 is an arc surface, that is, the surface of the telescopic slide rod 12 supporting the flexible screen 2 is arc-shaped. In this way, the surface smoothness of the outer side wall of the hollow ring column is improved, and the frictional resistance between the telescopic slide rod 12 and the flexible screen 2 is reduced. This facilitates the stretching and contracting of the flexible screen 2 during the sliding process of the telescopic slide rods 12 and prevents the flexible screen 2 from being damaged during the stretching or contracting process.

In one embodiment, please refer to FIG. 5 and FIG. 6, the sliding block 13 is positioned in the rotating disk guide groove 111, wherein the diameter of the sliding block 13 is slightly less than the width of the rotating disk guide groove 111. In this way, the sliding block 13 can slide in the rotating disk guide groove 111, wherein the thickness of the sliding block 13 can be greater than, less than, or equal to the depth of the rotating disk guide groove 111, preferably, the thickness of the sliding block 13 is slightly greater than the depth of the rotating disk guide groove 111. In this way, the contact between the telescopic slide rod 12 and the rotating disk 11 is prevented, and the mechanical resistance and damage caused by friction between the telescopic slide rod 12 and the rotating disk 11 are prevented. The shape of the sliding block 13 can be a right cylinder, a right prism, or other columnar structures that meet the size requirements.

In one embodiment, please refer to FIG. 3 to FIG. 5, the tensile unit 1 further includes a base 14 disposed on the side of the rotating disk 11 away from the telescopic slide rod 12, which is configured to fix the rotating disk 11. The base 14 includes an accommodating slot 141, wherein the rotating disk 11 is positioned in the accommodating slot 141. When the rotating disk 11 is a hollow annular disk, the accommodating slot 141 is a corresponding annular accommodating slot 141. Correspondingly, the base 14 may be a hollow annular base 14 as shown in FIG. 3 to FIG. 5, or a solid circular base 14. Further, the base 14 further includes an opening 142, and the opening 142 is defined on the outer side wall of the accommodating slot 141. Correspondingly, the rotating disk 11 includes a rotating body 112 and a rotating handle 113 protruding from the rotating body 112, wherein the rotating disk guide groove 111 is defined on the rotating body 112, the rotating body 112 is positioned in the accommodating slot 141, and the rotating handle 113 protrudes from the outer side wall of base 14 through the opening 142. The thickness of the rotating disk 11 is preferably less than the depth of the accommodating groove 141, and the ring width of the annular rotating body 112 is less than that of the annular accommodating slot 141, or the diameter of the circular rotating body 112 is less than the diameter of the circular accommodating slot 141. In this way, the rotating body 112 can be completely placed in the accommodating slot 141 and can rotate in the accommodating slot 141 under the action of the external force applied to the rotating handle 113, thereby reducing the frictional resistance between the accommodating slot 141 and the rotating disk 11. The central angle corresponding to the opening 142 of the base is greater than the predetermined angle to ensure that the rotating disk 11 can rotate within the range of the predetermined angle.

Figure 7:
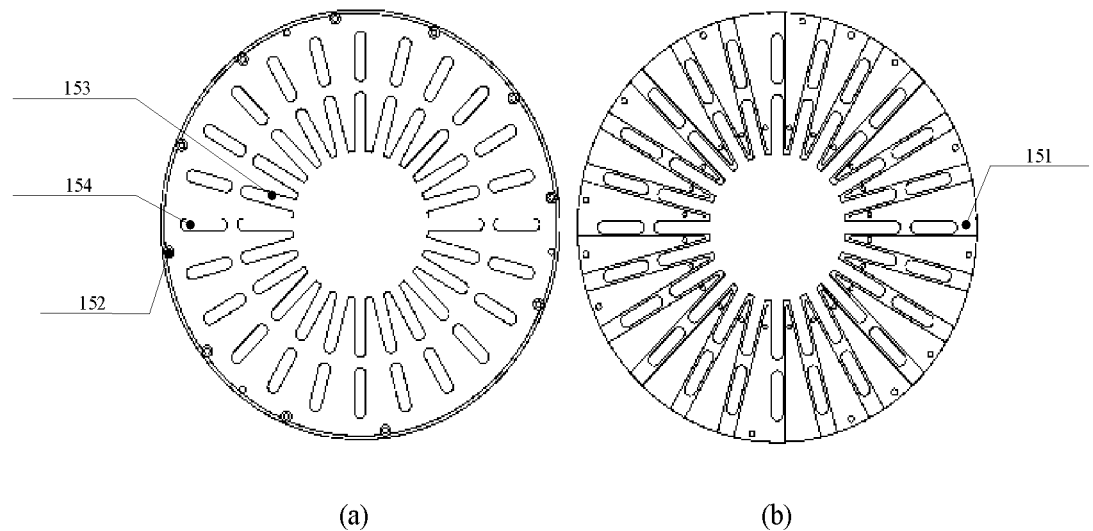
FIG. 7 is a schematic structural diagram of an upper cover of a tensile unit provided in one embodiment of the present application.
Figure 8:
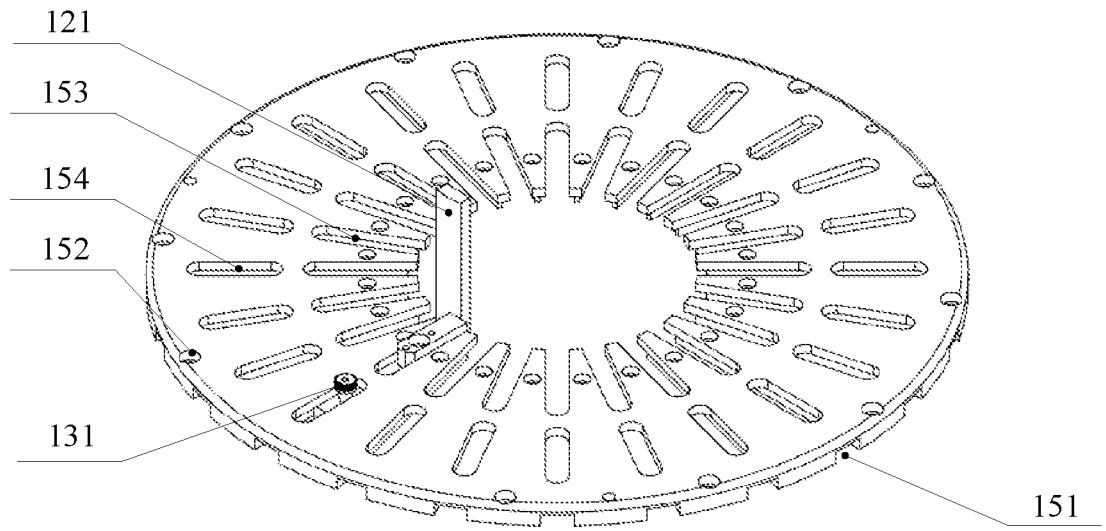
FIG. 8 is a front perspective structural schematic diagram of an upper cover, telescopic slide rods, and sliding blocks of a tensile unit provided by an embodiment of the present application.
Figure 9:
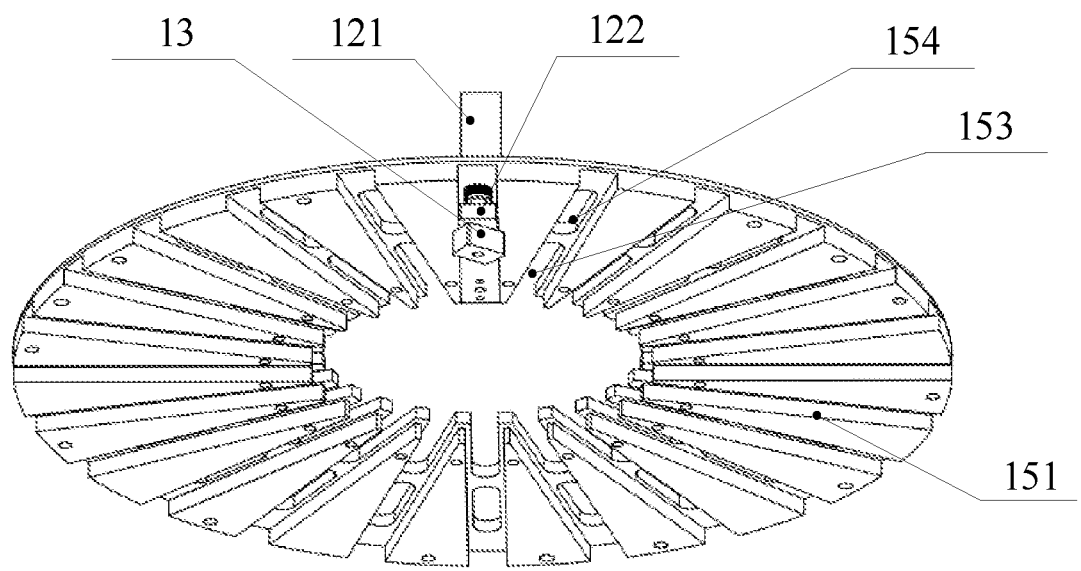
FIG. 9 is a schematic diagram of a back perspective structure of an upper cover, telescopic slide rods, and sliding blocks of a tensile unit provided by an embodiment of the present application.

In one embodiment, please refer to FIG. 3, and FIG. 7 to FIG. 9. FIG. 7 is a schematic structural diagram of an upper cover of a tensile unit provided in one embodiment of the present application, wherein FIG. 7 (*a*) is a schematic diagram of a front structure of the upper cover, and FIG. 7 (*b*) is a schematic diagram of a rear structure of the upper cover. FIG. 8 is a front perspective structural schematic diagram of an upper cover, telescopic slide rods, and sliding blocks of a tensile unit provided by an embodiment of the present application. FIG. 9 is a schematic diagram of a back perspective structure of an upper cover, telescopic slide rods, and sliding blocks of a tensile unit provided by an embodiment of the present application. The tensile unit 1 further includes an upper cover 15 positioned on the side of the telescopic slide rods 12 away from the base 14. The upper cover 15 is fixedly connected to the base 14, and it accommodates and protects the rotating disk 11 and the telescopic slide rods 12 together with the base 14. Specifically, the outer side wall of the accommodating slot 141 is provided with a base fixing hole 143 in the direction toward the upper cover 15. An upper cover fixing hole 152 is provided on the outer circumference of the upper cover 15 corresponding to the position of the base fixing hole 143. The connecting piece penetrates the upper cover fixing hole 152 and is fixedly connected with the base fixing hole 143 so that the upper cover 15 and the base 14 are tightly connected. Further, when both the base 14 and the upper cover 15 are annular, the base fixing hole 143 is further defined on the inner side wall of the slot, and the upper cover fixing hole 152 is correspondingly defined on the inner circumference of the upper cover 15.

The upper cover 15 includes a first limiting hole 153. The opening shape of the first limiting hole 153 is any of a rectangle, a rounded rectangle, a rectangle with a rounded corner at one end, a rectangle with a semicircular corner at one end, or a rectangle with a semicircular at both ends. The length of the rectangle is positioned on the diameter of the upper cover 15. The telescopic slide rod 12 penetrates through the first limiting hole 153 and can move along the diameter direction in the first limiting hole 153. In this way, the sliding direction and distance of the telescopic slide rod 12 are limited by the first limiting hole 153, and the sliding of the telescopic slide rod 12 is avoided at the same time. This ensures the sliding accuracy of the telescopic slide rod 12 and further ensures the stretching and contracting accuracy of the flexible screen 2. In one embodiment, when the upper cover 15 is in the shape of an annular disc, and the sliding rod 122 is positioned on the side of the telescopic slide rod 12 close to the outer side wall of the hollow ring column, the first limiting hole 153 can penetrate through the inner side wall of the upper cover 15, as shown in FIG. 8. In this way, the restriction on the telescopic slide rod 12 by the inner side wall of the upper cover 15 is released, and at the same time, the restriction on the diameter of the inner side wall of the upper cover 15 by the sliding amount of the telescopic slide rod 12 is released. While ensuring the sliding amount of the telescopic slide rod 12, the size of the inner circumference of the upper cover 15 is increased, the manufacturing cost of the upper cover 15 is reduced, and the aesthetics are improved. In another embodiment, when the sliding rod 122 is positioned on the side of the telescopic slide rod 12 close to the inner side wall of the hollow ring column, the first limiting hole 153 can penetrate through the outer side wall of the upper cover 15. In other embodiments, the first limiting hole 153 may not penetrate through the inner side wall of the upper cover 15.

Further, the upper cover 15 further includes second limiting holes 154 arranged in a one-to-one correspondence with the first limiting holes 153. The second limiting hole 154 and the corresponding first limiting hole 153 are located on the same diameter. The telescopic slide rod 12 penetrates the first limiting hole 153, and the screw 131 penetrates or is positioned in the second limiting hole 154. The screw 131 can move along the diameter direction in the second limiting hole 154, as shown in FIG. 8. In this way, the sliding direction and sliding distance of the screw 131 are limited by the second limiting hole 154, and the sliding of the screw 131 is avoided at the same time. It is equivalent to limiting and avoiding the other end of the telescopic slide rod 12, which further ensures the sliding accuracy of the telescopic slide rod 12. In one embodiment, the sliding rod 122 is positioned on the side of the telescopic slide rod 12 close to the outer side wall of the hollow ring column, and the second limiting hole 154 is positioned on the side of the first limiting hole 153 away from the center of the upper cover 15. In another embodiment, the sliding rod 122 is positioned on the side of the telescopic slide rod 12 close to the inner side wall of the hollow ring column, and the second limiting hole 154 is positioned on the side of the first limiting hole 153 facing the center of the upper cover 15.

Further, as shown in FIG. 8 and FIG. 9, the upper cover 15 further includes an upper cover guide groove 151. The upper cover guide groove 151 is defined on the side of the upper cover 15 facing the rotating disk 11. The upper cover guide grooves 151 are defined in a one-to-one correspondence with the first limiting holes 153 and the second limiting holes 154. The sliding rod 122 is disposed in the upper cover guide groove 151 and can move along the diameter direction in the upper cover guide groove 151. In one embodiment, the width of the sliding rod 122 is greater than the width of the tensile rod 121 and the diameter of the screw 131, then the width of the upper cover guide groove 151 is greater than the width of the first limiting hole 153 and the width of the second limiting hole 154, as shown in FIG. 9. This is beneficial to the stability of the telescopic slide rod 12. In other embodiments, the width of the sliding rod 122 may also be equal to or less than the width of the tensile rod 121. Further, the upper cover guide groove 151 penetrates the outer side wall of the upper cover 15. In this way, sufficient space can be reserved for the sliding of the sliding rod 122 while the restriction on the size of the upper cover 15 by the sliding amount of the telescopic slide rod 12 can be released. The size of the upper cover 15 is reduced to reduce the size and cost of the tensile unit 1. In one embodiment, when the upper cover 15 is in the shape of an annular disc, the upper cover guide groove 151 may penetrate through the inner side wall of the upper cover 15, as shown in FIG. 8 and FIG. 9.

Figure 10:
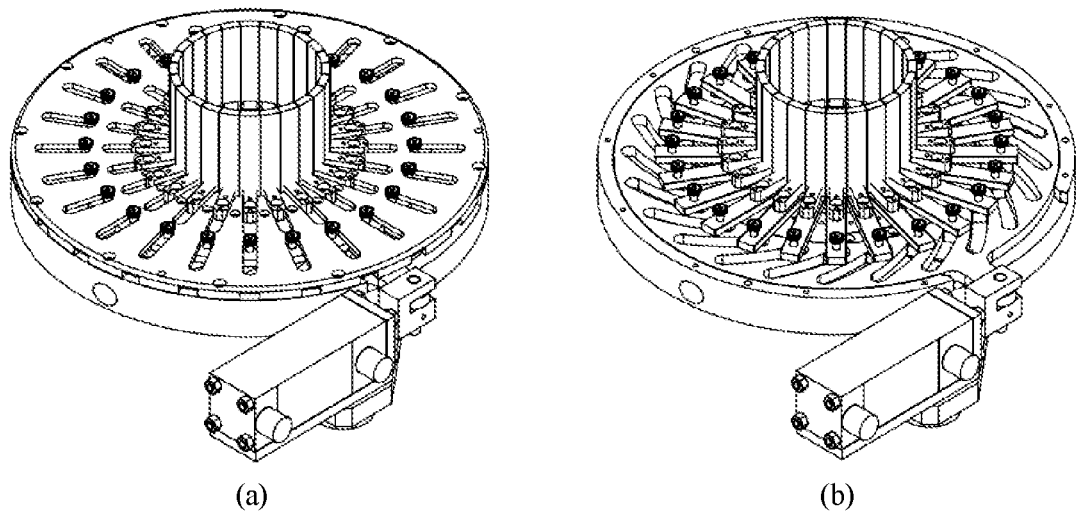
FIG. 10 is a schematic structural diagram of a flexible screen tensile test device provided in one embodiment of the application in a contracting state.
Figure 11:
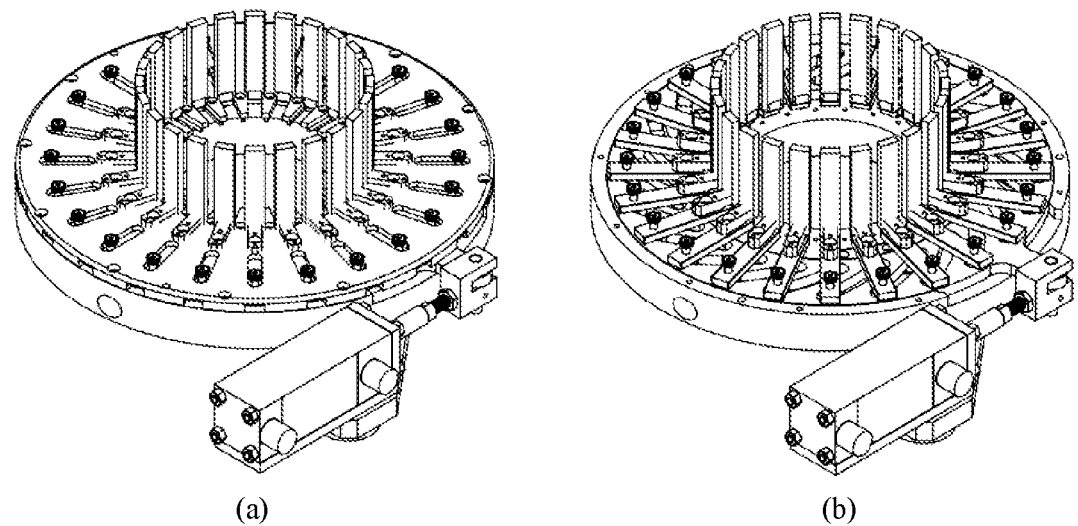
FIG. 11 is a schematic structural diagram of a flexible screen tensile test device provided in one embodiment of the application in a stretching state.

Please refer to FIG. 10 and FIG. 11. FIG. 10 is a schematic structural diagram of a flexible screen tensile test device provided in one embodiment of the application in a contracting state, wherein FIG. 10 (a) is a first-type three-dimensional structural schematic diagram of the test device (including the upper cover) in a contracting state, and FIG. 10 (b) is a second-type three-dimensional structural schematic diagram of the test device (excluding the upper cover) in a contracting state. FIG. 11 is a schematic structural diagram of a flexible screen tensile test device provided in one embodiment of the application in a stretching state, wherein FIG. 11 (a) is a first-type three-dimensional structural schematic diagram of the test device (including the upper cover) in a stretching state, and FIG. 11 (b) is a second-type three-dimensional structural schematic diagram of the test device (excluding the upper cover) in a stretching state. The predetermined angle is D, the first diameter is d1, and the second diameter is d2. When the test device is in the contracting state, the rotating disk 11 can be regarded as not rotating, the telescopic slide rods 12 are close to each other, and are annularly arranged to form a first hollow ring column, the diameter of the first hollow ring column is the first diameter d1. Specifically, the sliding block 13 is positioned in the rotating disk guide groove 111 at a position close to the central axis of the first hollow ring column, the screw 131 is positioned in the second limiting hole 154 at a position close to the central axis of the first hollow ring column, and the tensile rod 121 is positioned in the first limiting hole 153 at a position close to the central axis of the first hollow ring column. At this time, the flexible screen 2 located outside the first hollow ring column is in a contracted state, that is, in an unstretched state. When the rotating disk 11 rotates, the sliding block 13 slides in the direction away from the central axis of the first hollow ring column in the rotating disk guide groove 111, thereby driving the telescopic slide rods 12 to slide in the direction away from the central axis of the first hollow ring column. The telescopic slide rods 12 move away from each other and the parts of the telescopic slide rods 12 perpendicular to the rotating disk 11 are arranged annularly to form a second hollow ring column, wherein the diameter of the second hollow ring column is the second diameter d2, the second diameter d2 is greater than the first diameter d1, and the test device is in a stretching state. At this time, the flexible screen 2 positioned outside the second hollow ring column is in a stretching state. When the rotation of the rotating disk 11 reaches a predetermined angle D, the test device is in a state of maximum expansion, and the flexible screen 2 is in a state of maximum tension. When the rotating disk 11 rotates in a reverse direction, the sliding blocks 13 in the rotating disk guide groove 111 slide in the direction of approaching the central axis of the second hollow ring column, thereby driving the telescopic slide rods 12 to slide in the direction approaching the central axis of the second hollow ring column. The telescopic slide rods 12 approach each other again, and the test device switches to the contracting state again, thereby driving the flexible screen 2 to switch to the contracting state. The test device provided in the embodiment of the present application realizes the stretching and contracting of the flexible screen 2 to be tested within the stretching range through the synchronous sliding of the telescopic slide rods 12 evenly arranged on the outer circumference of the hollow ring column. In addition, during the stretching and/or contracting process, each part of the flexible screen 2 is uniformly stressed, which avoids test errors due to uneven stress, improves the accuracy of the test, and satisfies the test requirements of the flexible screen 2.

In one embodiment, please refer to FIG. 2 and FIG. 3, the test device further includes a drive unit 3 and a controller 4 connected to the drive unit 3. The drive unit 3 includes a driving handle and a force-displacement sensor, and the driving handle is connected to the rotating handle 113 of the rotating disk 11. The controller 4 controls the driving handle to perform telescopic motion, thereby driving the rotating handle 113 to rotate around the outer circumference of the rotating body 112 in the base opening 142, thereby causing the rotating disk 11 to rotate within the predetermined angle. In this way, the automatic stretching and contracting of the test device are realized, so that the internal force of the flexible screen 2 is more uniform and controllable. The force-displacement sensor is connected to the drive handle, which can monitor the stretching amount and the force condition of the flexible screen 2 in real-time and generate a force-displacement curve, thereby realizing real-time automatic control of the test device, and the force-displacement curve is used for subsequent data analysis.

In one embodiment, please refer to FIG. 2, the test device further includes a test pattern signal generator 5 and a computer 6. The test pattern signal generator 5 is connected to the flexible screen 2, and can collect current and voltage data of the flexible screen 2 under different stretching amounts and tensile forces. The computer 6 is connected to the test pattern signal generator 5 and the controller 4. The computer 6 can obtain the force-displacement data collected in the force-displacement sensor and the current-voltage data collected by the test pattern signal generator 5, and analyze the force-displacement data and the current-voltage data. In this embodiment of the present application, the force-displacement sensor is used to monitor the stretching amount and stress condition of the flexible screen 2 in real-time, while the test pattern signal generator 5 is used to collect current and voltage data of the flexible screen 2 under different stretching amounts and tensile forces in real-time. In addition, the collected data is analyzed by the computer 6 to realize the real-time monitoring of the flexible screen 2 and data recording under different stretching states, and realize the automatic test of the flexible screen 2.

Figure 12:
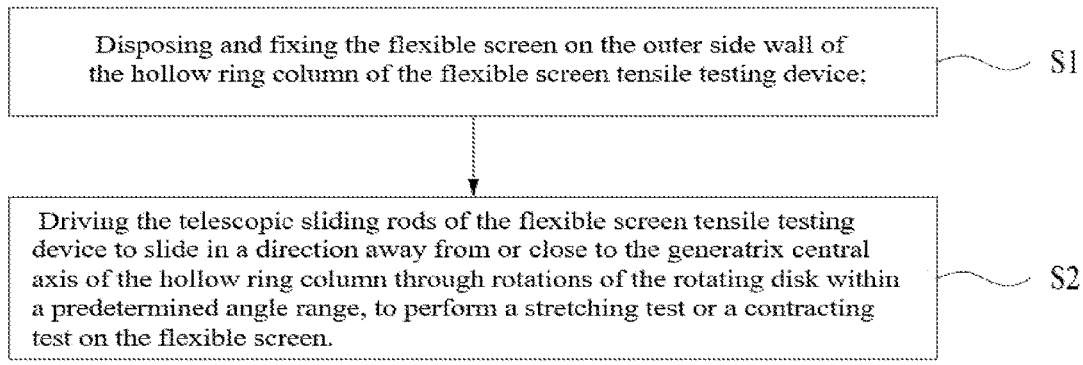
FIG. 12 is a flowchart of a flexible screen test method provided by an embodiment of the present application.

Correspondingly, the embodiments of the present application further provide a flexible screen test method, and each step of the test method is implemented by using the test device described in any of the embodiments of the present application. Please refer to FIG. 12. FIG. 12 is a flowchart of a flexible screen test method provided by an embodiment of the present application. The test method includes: Step S1, disposing and fixing the flexible screen on the outer side wall of the hollow ring column of the flexible screen tensile test device; and Step S2, driving the telescopic slide rods of the flexible screen tensile test device to slide in a direction away from or close to the central axis of the hollow ring column through rotations of the rotating disk to perform a tensile test or a contracting test on the flexible screen.

The flexible screen tensile test device and test method provided in the embodiments of the present application are suitable for annular flexible screens, and for strip-shaped flexible screens such as rectangular flexible screens. When the flexible screen is a strip-shaped flexible screen, before disposing and fixing the flexible screen on the outer side wall of the hollow ring column of the test device, the test method further includes: connecting the flexible screen in a ring shape by means of snaps, clamping, magnetic attraction, or the like.

In the test method provided by the embodiment of the present application, the flexible screen is disposed and fixed on the outer side wall of the hollow ring column of the test device, and the telescopic slide rods are driven to slide along the direction away from or close to the central axis of the hollow ring column by controlling the rotation of the rotating disk within a predetermined angle. Therefore, the stretching and contracting of the flexible screen within the stretching range is realized. In this way, during the tensile test of the flexible screen, the tensile stress in the flexible screen is uniformly distributed, which meets the testing requirements of the flexible screen.

Figure 13:
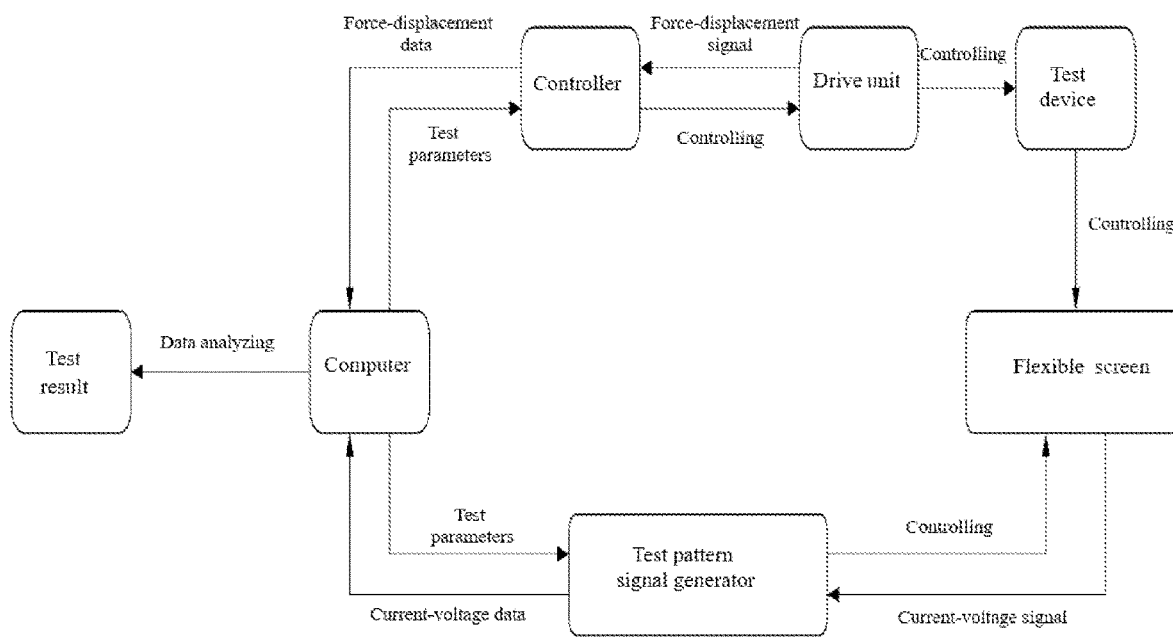
FIG. 13 is a logical block diagram of a flexible screen test method provided by an embodiment of the present application.

In an embodiment, please refer to FIG. 13, which is a logical block diagram of a flexible screen test method provided by an embodiment of the present application. The test method includes:

Setting test parameters corresponding to the predetermined angle through the computer, and transmitting the test parameters to the controller and the test pattern signal generator, respectively;

Controlling the drive unit to drive the test device by the controller, specifically, driving the rotating disk to rotate to drive the telescopic slide rods to slide in a direction away from or close to the central axis of the hollow ring column to stretch or contract the flexible screen; Monitoring a force-displacement signal of the flexible screen in real-time through the force-displacement sensor in the drive unit;

Obtaining the force-displacement signal through the controller and converting the force-displacement signal into corresponding force-displacement data;

Driving the flexible screen to perform light-emitting display through the test pattern signal generator and monitoring a current-voltage signal of the flexible screen in real-time, and then converting the current-voltage signal into a corresponding current-voltage data; and Obtaining the force-displacement data and the current-voltage data through the computer, and analyzing the force-displacement data and the current-voltage data to obtain a test result of the flexible screen.

In the test method provided in this embodiment, a force-displacement sensor is used to monitor the stretching amount and stress condition of the flexible screen in real-time, and the test pattern signal generator is used to collect real-time current and voltage data of the flexible screen at different stretching or contracting amount and tensile force. Then, the collected data is analyzed by a computer to realize real-time monitoring and recording of the flexible screen under different stretching states.

As described above, the embodiments of the present application provide a flexible screen tensile test device and a flexible screen tensile test method. The test device supports the flexible screen to be tested through a hollow ring column formed by telescopic slide rods that are annularly arranged. During the tensile test of the flexible screen, the telescopic slide rods are driven to slide in the direction away from or close to the central axis of the hollow ring column through controlling the rotation of the rotating disk within a predetermined angle, to realize the stretching and contracting of the flexible screen within a stretching range. In this way, the tensile stress in the flexible screen is uniformly distributed, which meets the testing requirements of the flexible screen. In addition, the force-displacement sensor is used to monitor the stretching amount and stress condition of the flexible screen in real-time, and the test pattern signal generator is used to collect real-time current and voltage data of the flexible screen at different stretching or contracting amount and tensile force. Then, the collected data is analyzed by a computer to realize real-time monitoring and recording of the flexible screen under different stretching states, which realizes automatic testing of the flexible screen.

The flexible screen tensile test device and the flexible screen test method provided by the embodiments of the present application have been described in detail above. The principles and implementations of the present application are described with specific examples herein. The descriptions of the above embodiments are only used to help understand the method of the present application and its core idea. In addition, for one skill in the art, according to the idea of the present application, there will be changes in the specific embodiments and the scope of application. In conclusion, the content of this specification should not be construed as a limitation on the present application.

What is claimed is:

1. A flexible screen tensile test device, comprising a tensile unit, wherein the tensile unit comprises:
    a rotating disk comprising rotating disk guide grooves;
    telescopic slide rods positioned above the rotating disk and corresponding to the rotating disk guide grooves in a one-to-one correspondence, wherein the telescopic slide rods are annularly arranged to form a hollow ring column, a generatrix of the hollow ring column is perpendicular to the rotating disk, and an outer side wall of the hollow ring column is configured to support a flexible screen; and
    sliding blocks connected with the telescopic slide rods and positioned in the rotating disk guide grooves;
    wherein the rotating disk is rotatable within a predetermined angle to drive the telescopic slide rods to slide in a direction away from or close to a central axis of the hollow ring column and to cause a diameter of the hollow ring column to change.

2. The flexible screen tensile test device of claim 1, wherein the rotating disk guide grooves are uniformly arranged on the rotating disk along a circumference of the rotating disk.

3. The flexible screen tensile test device of claim 2, wherein the rotating disk is annular, and an included angle between one of the rotating disk guide grooves and the circumference of the rotating disk is an acute angle.

4. The flexible screen tensile test device of claim 1, wherein each telescopic slide rod comprises a tensile rod and a sliding rod, one end of the tensile rod is vertically connected with the sliding rod, and another end of the tensile rod is connected with a respective one of the sliding blocks, wherein the sliding rod is parallel to the rotating disk, the tensile rod is perpendicular to the rotating disk, and each tensile rod of the telescopic slide rods are annularly arranged to form the hollow ring column.

5. The flexible screen tensile test device of claim 4, wherein the tensile rod and the sliding rod are integrated, or the tensile rod and the sliding rod are fixedly connected.

6. The flexible screen tensile test device of claim 1, wherein each sliding block is connected to a respective one of the telescopic slide rods through a connecting piece, and the sliding block is rotatable with the connecting piece as a rotation axis.

7. The flexible screen tensile test device of claim 1, wherein a shape of a part of an outer side surface of the hollow ring column formed by the telescopic slide rods is an arc surface.

8. The flexible screen tensile test device of claim 1, wherein the tensile unit further comprises a base arranged on a side of the rotating disk away from the telescopic slide rods, wherein the base comprises an accommodating slot, and the rotating disk is arranged in the accommodating slot.

9. The flexible screen tensile test device of claim 8, wherein the base further comprises an opening positioned on an outer side wall of the accommodating slot, wherein the rotating disk comprises a rotating body positioned in the accommodating slot and a rotating handle protrudes from the rotating body, the rotating disk guide groove is defined on the rotating body, and the rotating handle protrudes from an outer side wall of the base through the opening.

10. The flexible screen tensile test device of claim 9, wherein a central angle corresponding to the opening of the base is greater than the predetermined angle.

11. The flexible screen tensile test device of claim 8, wherein the tensile unit further comprises an upper cover positioned on a side of the telescopic slide rods away from the base, wherein the upper cover and the base are fixedly connected.

12. The flexible screen tensile test device of claim 11, wherein the upper cover comprises a first limiting hole positioned on a diameter of the upper cover, one of the telescopic slide rods passes through the first limiting hole and is slidable along a diameter direction of the upper cover in the first limiting hole.

13. The flexible screen tensile test device of claim 12, wherein the upper cover further comprises a second limiting hole corresponding to the first limiting hole, the second limiting hole and the first limiting hole are positioned on a same diameter; and wherein each sliding block is connected to a respective one of the telescopic slide rods through a connecting piece, and the connecting piece penetrates the telescopic slide rod and is partially located in the second limiting hole.

14. The flexible screen tensile test device of claim 13, wherein the second limiting hole is positioned on a side of the first limiting hole away from a center of the upper cover, a shape of the upper cover is annular, and the first limiting hole penetrates an inner side wall of the upper cover; or the second limiting hole is positioned on a side of the first limiting hole facing a center of the upper cover, and the first limiting hole penetrates an outer side wall of the upper cover.

15. The flexible screen tensile test device of claim 11, wherein the upper cover further comprises an upper cover guide groove defined on a side of the upper cover facing the rotating disk; wherein each telescopic slide rod comprises a tensile rod and a sliding rod, the tensile rod and the sliding rod are vertically connected, each tensile rod of the telescopic slide rods are annularly arranged to form the hollow ring column, and the sliding rod is positioned in the upper cover guide groove.

16. The flexible screen tensile test device of claim 15, wherein the upper cover guide groove penetrates through a side wall of the upper cover.

17. The flexible screen tensile test device of claim 1, further comprising a drive unit and a controller connected to the drive unit, wherein the drive unit comprises a driving handle and a force-displacement sensor, the driving handle is connected to the rotating disk, and the controller controls the driving handle to drive the rotating disk to rotate within the predetermined angle.

18. The flexible screen tensile test device of claim 17, further comprising a test pattern signal generator and a computer, wherein the test pattern signal generator is connected to the flexible screen to collect current and voltage data of the flexible screen and feeding the current and the voltage data to the computer.

19. A flexible screen test method, implemented by the flexible screen tensile test device according to claim 18, wherein the flexible screen test method comprises:
- disposing and fixing the flexible screen on the outer side wall of the hollow ring column of the flexible screen tensile test device; and
- driving the telescopic slide rods of the flexible screen tensile test device to slide in a direction away from or close to the central axis of the hollow ring column through rotations of the rotating disk, to perform a tensile test or a contracting test on the flexible screen.

20. The flexible screen test method of claim 19, wherein the step of driving the telescopic slide rods of the flexible screen tensile test device to slide in the direction away from or close to the central axis of the hollow ring column through the rotations of the rotating disk to perform the tensile test or the contracting test on the flexible screen comprises:
- controlling the drive unit of the flexible screen tensile test device through the controller to drive the rotating disk to rotate, drive the telescopic slide rods to slide in a direction away from or close to the central axis of the hollow ring column, and cause the flexible screen to stretch or contract;
- monitoring a force-displacement signal of the flexible screen in real-time through the force-displacement sensor of the flexible screen tensile test device;
- monitoring a current-voltage signal of the flexible screen in real-time through the test pattern signal generator of the flexible screen tensile test device; and
- analyzing the force-displacement signal and the current-voltage signal through the computer of the flexible screen tensile test device to obtain a test result of the flexible screen.

* * * * *